United States Patent [19]

Sylvan

[11] 3,795,860

[45] Mar. 5, 1974

[54] NETWORK TESTER EMPLOYING LATCHED TEST SWITCHING UNITS

[75] Inventor: Tage Peter Sylvan, Milton, Mass.

[73] Assignee: Teradyne, Inc., Boston, Mass.

[22] Filed: July 13, 1972

[21] Appl. No.: 271,269

[52] U.S. Cl. ................................ 324/73 R, 324/51

[51] Int. Cl. ........................ G01r 15/12, G01r 31/02

[58] Field of Search.... 324/73 AT, 73 AC, 51, 73 R

[56] References Cited

UNITED STATES PATENTS

| | | | |
|---|---|---|---|
| 3,665,299 | 5/1972 | Yarbrough | 324/51 |
| 3,535,633 | 10/1970 | Fallon | 324/73 |
| 3,370,232 | 2/1968 | Wickersham | 324/51 X |

*Primary Examiner*—Alfred E. Smith
*Assistant Examiner*—Rolf Hille
*Attorney, Agent, or Firm*—Kenway, Jenney & Hildreth

[57] ABSTRACT

The testing apparatus disclosed herein is adapted to test backplane wiring so as to determine if all desired connections exist and whether any undesired connections may be present. Such backplanes typically comprise a multiplicity of terminal points which may be interconnected in arbitrary manner to form a plurality of networks of connected points. The tester employs an addressable switching and memory unit for each terminal point. When addressed, each point is first connected to a first bus and, when the addressing is terminated, is thereafter connected to a second bus, this second connection being maintained under the control of the memory or latch associated with each switching unit. Prior to being addressed, each point is in effect isolated by the switching unit and allowed to float in potential. As the successive points in a given network are addressed, the system tests for continuity between the first and second buses to determine if the desired connections exist. After all terminal points which should be in the selected network have been latched into connection with the second bus, all remaining points are commonly switched into connection with the first bus. Testing for isolation at this time determines whether any undesired connections affecting the selected network are present.

11 Claims, 3 Drawing Figures

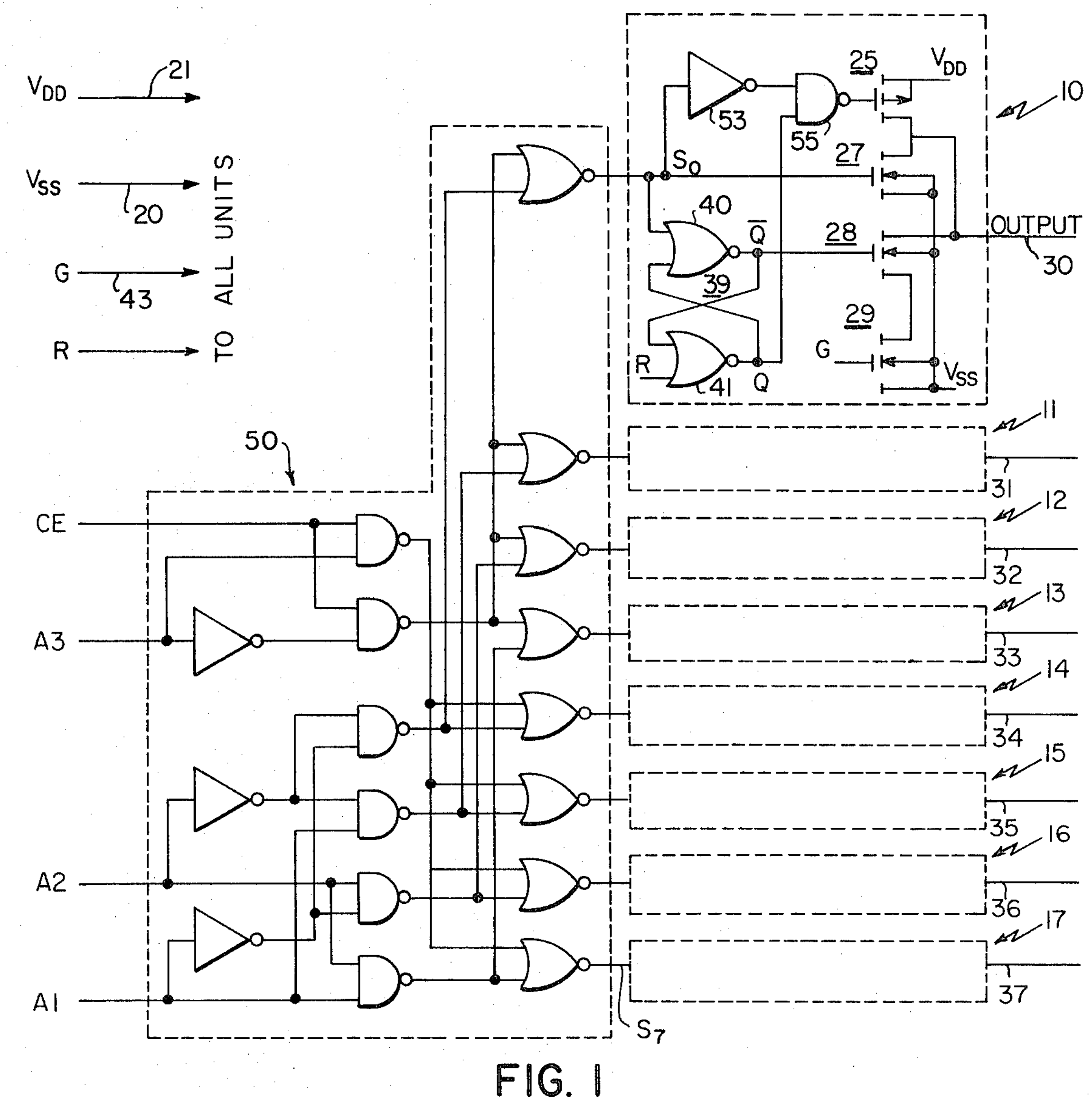

FIG. 1

| CE | $A_3$ | $A_2$ | $A_1$ | $S_0$ | $S_1$ | $S_2$ | $S_3$ | $S_4$ | $S_5$ | $S_6$ | $S_7$ |
|---|---|---|---|---|---|---|---|---|---|---|---|
| L | X | X | X | L | L | L | L | L | L | L | L |
| H | L | L | L | H | L | L | L | L | L | L | L |
| H | L | L | H | L | H | L | L | L | L | L | L |
| H | L | H | L | L | L | H | L | L | L | L | L |
| H | L | H | H | L | L | L | H | L | L | L | L |
| H | H | L | L | L | L | L | L | H | L | L | L |
| H | H | L | H | L | L | L | L | L | H | L | L |
| H | H | H | L | L | L | L | L | L | L | H | L |
| H | H | H | H | L | L | L | L | L | L | L | H |

FIG. 2

| STEP | SEQUENTIAL TRUTH TABLE | | | | | | |
|---|---|---|---|---|---|---|---|
| | FUNCTION | R | $S_0$ | G | Q | $\bar{Q}$ | OUT |
| 1 | RESET, OFF | H | L | L | L | H | OFF |
| 2 | RESET, GATE | H | L | H | L | H | LOW |
| 3 | INITIAL STATE, OFF | L | L | L | L | H | OFF |
| 4 | INITIAL STATE GATE | L | L | H | L | H | LOW |
| 5 | SELECTED STATE | L | H | X | H | L | LOW |
| 6 | SET STATE | L | L | X | H | L | HIGH |
| 7 | RESET AND SELECT | H | H | X | L | L | LOW |

FIG. 3

NETWORK TESTER EMPLOYING LATCHED TEST SWITCHING UNITS

BACKGROUND OF THE INVENTION

This invention relates to a circuit tester and more particularly to a backplane tester adapted to determine whether a multiplicity of terminal points are interconnected in a desired pattern of networks and whether any undesired interconnections exist.

As electronics systems become more sophisticated and complicated, it has become increasingly difficult to determine whether wiring harnesses have been correctly constructed and to locate faults once the existence of a fault has been determined. For example, in some digital computer systems, a large number of circuit boards or cards, each having in the order of 100 terminals, may be plugged side-by-side into a rack panel having a corresponding plurality of edge-connector sockets. Connections between the boards are then established by wiring which interconnects the socket terminals, e.g. soldered or wire-wrapped connections.

As the pattern of interconnection in such a backplane is typically somewhat arbitrary and as the number of points in each network may also be variable, the possibility of a wiring error is relatively high. As is understood, such an error can be either the failure to make a desired connection or the making of an undersired connection. In order to assure that such a backplane is properly wired, it is therefore necessary not only to determine that all desired connections exist but also that there are no undesired connections. To perform such an operation manually is a task requiring an enormous expenditure of time, while also introducing the possibility of human failure in the testing process itself.

In that the testing process is itself iterative in nature and requires the exhaustive evaluation of a large number of connection combinations or permutations, it has been proposed heretofore that such testing be performed under computer control. However, as the number of terminals involved in a given system or backplane increases, the time required even for computer testing becomes significant. Further, in order to permit the computer to test between arbitrarily selected pairs among the multiplicity of terminal points involved, connection typically must be made between each and every pair of terminals in the matrix under test. The requirement of such a large number of interconnections or connections leading back to the computer has introduced the problem that test setup requires a significant amount of time. Further, the statistical possibility of lead breakage or erratic connections becomes significant.

Among the several objects of the present invention may be noted the provision of a method and apparatus for wiring testing which facilitates the exhaustive testing of interconnections in a multiplicity of terminal points; the provision of such a method and apparatus which tests not only to determine if all desired connections exist but also that no undesired connections exist; the provision of such a method and appparatus which provide rapid and reliable testing; the provision of such apparatus in which only a relatively small number of connections or leads are required between a matrix under test and a computer controlling the testing; the provision of such a system which can be readily expanded; and the provision of such apparatus which is relatively simple and inexpensive.

SUMMARY OF INVENTION

Briefly, a system in accordance with the present invention is adapted to test interconnections in a matrix of terminal points. The system involves a plurality of test switching units, one for each terminal point, and a decoding system permitting each test switching unit to be selectively addressed by means of coded selection signals. Each of the test switching units operates, when addressed, to connect the respective terminal point to a first bus which is common to all of the test switching units. Each unit also operates, after termination of addressing thereof, to connect the respective terminal point to a second bus which is also common to all of the test switching units. By testing for continuity between the first and second buses during connection of each point in turn to the first bus, the existence of the desired connections may be established. The testing system also includes a plurality of isolation test switching means, one for each terminal point. The isolation test switching means are responsive to a gate signal commonly applied to all of the isolation test switching means for connecting to the first bus those terminal points not then connected to the second bus. By testing for isolation between the first bus and the second bus during application of the gate signal, the existence of an undesired connection affecting the selected network can be determined.

BRIEF DESCRIPTION OF THE DRAWINGS

FIG. 1 is a logic diagram of the test switching and latch circuitry of the present invention associated with a group of eight terminal points, together with associated decoding circuitry;

FIG. 2 is a truth table for a decoding matrix incorporated in the circuitry of FIG. 1; and FIG. 3 is a sequential truth table for a test unit employed in the circuitry of FIG. 1.

Corresponding reference characters indicate corresponding parts throughout the several views of the drawing.

DESCRIPTION OF THE PREFERRED EMBODIMENT

The preferred implementation of testing apparatus of the present invention employs integrated circuitry of the complementary-symmetry/metal-oxide-semiconductor type. Such integrated circuits are commonly referred to as COS/MOS or C–MOS devices. As is explained in greater detail hereinafter, the inherent characteristics of such devices strongly complement the design characteristics employed in the preferred embodiment illustrated herein.

In general, it may be noted that conventional logic families of the devices are for the most part made up of individual logic gates each of which comprises both P-channel and N-channel field effect transistors constructed using metal-oxide-semiconductor fabrication techniques. The use of complementary symmetry design allows the individual gages to function in an essentially no-current drain condition in either binary logic state. Further, the MOS fabrication technology results in an insulated gate construction which assures that practically no drive current is required for each gate in either binary state. The solid state division of the RCA Corporation, located in Somerville, New Jersey 08876, manufactures a wide line of standard C-MOS logic circuits ranging from individual gages through so-called medium-scale and large-scale integration and also makes available custom logic circuits made up of arrays of conventional logic elements. A similar line of standard circuits and custom fabrication service using COS/MOS devices is also available from National Semiconductor Company.

As is understood in the art, the output transistors in a typical C–MOS integrated circuit must occupy a substantially larger area on the chip than those transistors which comprise internal logic gates. This is because the output transistors may be expected to drive a plurality of input circuits, e.g. a large fan-out or substantial lead length or must otherwise provide significant current to a load. Accordingly, output current switching is typicallly handled somewhat separately or buffered from the internal logic circuitry. Further, in the output switching circuitry employed in the present invention, further considerations regarding linear drive capability and the logic functions necessary are involved and thus the output transistors are indicated individually in FIG. 1 although the circuitry driving these output transistors is defined in conventional NAND/NOR logic symbology.

Referring now to FIG. 1, the circuitry illustrated there is adapted for controlling the state or condition of a group of eight terminal points and is preferably constructed on a single semiconductor chip. As will be apparent hereinafter, the number of leads required for this particular logic system is appropriate for an industry standard package, e.g. a 16 lead dual-in-line package. As noted previously, the entire matrix of terminal points to be tested may comprise in the order of 100,000 points and thus an entire test system in accordance with the present invention will comprise a large number of the custom integrated circuits of FIG. 1. For each of the eight terminal points handled by the FIG. 1 circuitry, there is provided a respective test switching and latch unit, 10–17 respectively. The units 10–17 are identical and only the first, unit 10, is illustrated in detail.

Two of the external leads to the device of FIG. 1 are the ground lead or bus 20 and a positive supply bus 21. These supply potentials are provided to each of the units 10–17, the supply connections at the output circuits being indicated, in industry conventional manner by the designation $V_{DD}$ and $V_{SS}$ to indicate the positive and ground supplies respectively. As described in greater detail hereinafter, each test unit 10–17 controls the state of a corresponding terminal point in the matrix to be tested, these connections being made through respective device output leads, designated 30–37.

Each test unit 10–17 comprises four FET output transistors, a P-channel transistor 25 and three N-channel transistors 27, 28 and 29. As is explained in greater detail hereinafter, this output arrangement is operable as a three-state switching device permitting the respective output lead 30–37 to be connected to either supply bus or to be isolated. The connections of the several transistors are as follows. The P-channel transistor 25 is connected between the positive supply bus 21 and the respective output lead 30, while the N-channel transistor 27 is connected between the negative supply bus 20 and the output lead. The conduction path through transistor 27 is paralleled or shunted by another path comprising the two transistors 28 and 29 connected in series. In other words, the output lead 30 can be connected to the ground supply bus either through the transistor 27 or through the series pair comprising transistors 28 and 29. As is explained in greater detail hereinafter, this latter, series path is utilized in testing for the existence of undesired connections.

Each unit 10–17 also includes a flip-flop or latch circuit 39 comprising a pair of cross-connected NOR gates 40 and 41. The output signals from flip-flop 39 are designated Q and $\overline{Q}$ in conventional fashion. One of the inputs to the device of FIG. 1 is a reset signal which is provided commonly to all of the units 10–17 through a device input lead 43. This signal, designated R, is applied to the flip-flop 39 so as to place it in a "reset" state in which the output signal Q is low.

Three of the inputs to the device of FIG. 1 are for coded address signals, designated A1–A3, while a fourth input is for a chip enable signal, designated CE. The chip enable and address signals are applied to an essentially conventional decoder network 50. The address signals A1–A3 are decoded in conventional one-of-eight manner to provide a respective selected signal for each of the test units 10–17, the respective select signals being designated $S_0$–$S_7$. An individual test unit 10–17 may be considered to be enabled or addressed when the respective select signal is high. The generation of a high or affirmative select signal for any unit is also conditioned upon the presence of a high at the chip enable input. The truth table for this decoder network is given in FIG. 2 in which L indicates a low input or output state, H indicates a high input or output state and X indicates an indifferent or don't care condition.

Within each unit 10–17, the respective select signal is applied directly to the gate of the N-channel transistor 27 and also to the set input to the flip-flop 39. The respective select signal is also applied, through an inverter 53, to a NAND gate 55 where it is combined with the Q output signal from the flip-flop 39. The output signal from the NAND gate 55 is applied to the gate of the P-channel transistor 25. As the transistor 25 is of the P-channel type, its channel circuit is rendered conductive by the application of a low signal as contrasted with the N-channel transistors 27–29 which are rendered conductive by a high signal.

Conduction through the N-channel transistor 28 is controlled by the $\overline{Q}$ output signal from the flip-flop 39 while conduction through the N-channel transistor 29 is controlled by a gate signal, designated G, which constitutes one of the inputs to the system of FIG. 1 and which is applied commonly to all of the test units 10–17. As the control signal G is applied directly to the gate terminal of each transistor 29 without the interposition of intervening logic gates of the digital or switching type, it can be seen that conduction through transistor 29 can be controlled in a gradual or linear manner as distinct from the abrupt step change characteristic of digital control signals.

Consistent with the foregoing, the internal operation of each of the units 10-17 is as follows, reference being had to the sequential truth table of FIG. 3. When the reset signal goes high, the flip-flop 39 is reset so that its ouput signal Q goes low and the output signal $\overline{Q}$ goes high. Assuming that the respective select signal is not high, the N-channel transistor 27 will be turned off and the P-channel transistor 25 will be prevented from being turned on by the low state of the Q signal. While the N-channel transistor 28 is turned on by the $\overline{Q}$ signal, no actual conduction will take place through this path so long as the N-channel transistor 29 is not turned on. Since the output lead 30 is thus connected to neither of the ground bus nor the positive supply bus, it is in effect isolated or free to float in potential between the two supply levels. This state is indicated in the truth table of FIG. 3 by the designation "OFF".

When the latch 39 is in a reset condition, the application of the gate signal will establish a conducting path by turning on transistor 29 thereby pulling the output lead 30 down to ground potential as indicated in the second step of the sequential truth table of FIG. 3. As indicated in steps 3 and 4 of the truth table, the gate signal G can control the state of the output lead 30 between its isolated and low states even after the reset signal is terminated, as long as the flip-flop 39 remains in its reset state.

When, in response to the appropriate combination of address and chip enable signals, the respective select signal is applied to a given test unit 10–17, its flip-flop 39 is placed in its "set" state and the respective N-channel transistor 27 is turned on directly by the select signal. While the N-channel transistor 28 is directly turned off by the $\overline{Q}$ output signal from the flip-flop 39, the Q output signal from the flip-flop is prevented from immediately turning on the P-channel transistor 25 by the application of the inverted select signal as one of the inputs to the NAND gate 55. Thus, during the actual application of the respective select signal, the respective output lead 30 is connected to the ground bus through the transistor 27 rather than to the positive bus through the P-channel transistor 25. This state is represented on the fourth line of the FIG. 3 truth table. At the termination of the select signal, the situation reverses. The return of the select signal to the low level turns off the transistor 27 while the resultant high level signal provided by the inverter 53 enables the Q output signal from the flip-flop 39, operating through the NAND gate 55, to turn on the P-channel transistor 25. This is illustrated in step 6 of the sequential truth table of FIG. 3. If the reset and select signals are both applied simultaneously, a condition not normally encountered, the output lead 30 is pulled to its low state regardless of the condition of the gate signal.

As noted previously, a backplane or other matrix of terminal points to be tested may easily comprise in the order of 100,000 points. Accordingly, a complete backplane test system in accordance with the present invention will typically include a large number of the devices of FIG. 1 together with further addressing/selection circuitry to permit individual such devices to be enabled. While particular apparatus for addressing and controlling such an array of test units is described in my copending co-assigned application entitled Tester System being filed of even date herewith, it should be understood that may other such systems could be straightforwardly derived to employ these testing units to advantage. It is thus appropriate, at this point, to describe how the inherent operation of these individual test switching and latch units greatly facilitates the generalized testing of network matrices.

As also mentioned previously, the current drain of the internal logic gates employed in the illustrated embodiment when using C–MOS construction is so low that a connection or continuity established between the positive and ground supply buses through the device output transistors is readily detectable by virtue of the increased current drain on the supply irrespective of the states of the various internal gates and latches. Accordingly, the existence of a network of wired connections linking a plurality of terminal points may be determined or tested by sequentially addressing the test units corresponding to those terminal points in sequence and sensing for the presence of such an output circuit connection between the supply buses as the sequential testing progresses. If the network exists, such an output circuit connected will be sensed as each terminal point, subsequent to the first, is addressed. This comes about as follows. During the interval each test unit is being addressed, the respective terminal point is connected to the ground supply bus through the respective N-channel transistor 27. As the selection signal also causes the respective flip-flop 39 to be set, the subsequent termination of the select signal will cause the terminal point to then be connected to the positive supply bus through the P-channel transistor 25.

When the first point in a given network is addressed, no output circuit connection between the supply buses will be produced because all of the other terminal points in the matrix are in their initial or isolated state. However, when the second and subsequent points making up the desired network are addressed, such a connection will exist if the actual network conforms to the desired network. The connecting path, starting from the ground bus, is through the transistor 27 in the test unit then being addressed to the corresponding terminal point in the matrix; through the network being tested to the terminal points previously addressed; and through the P-channel transistors 25 in the previously addressed test units to the positive supply bus. As noted previously, the P-channel transistors in the previously addressed test units are maintained in conduction by the respective flip-flop or latch circuits which act as memory elements associated with each terminal point.

During the testing of a particular network, each terminal point comprising the network is latched in turn into connection with the positive bus. Thus, after the last such termial point has been addressed, all of the terminal points belonging in the network will be latched into conduction with the positive bus. To then test for isolation of the selected network from all other terminal points in the matrix, i.e. to determine that there are no improper connections existing which affect that network, the gate signal G is then applied while the supply current is monitored to determine the existence of an output circuit connection between the supply buses. The effect of applying the common gate signal is to simultaneously connect all remaining terminal points in the matrix to the ground supply bus by turning on the respective transistors 29. As the internal latch circuit 39 incorporated into each test unit 10–17 operates, when set, to turn off the transistor 28 in series with each transistor 29, only those units which were not previously addressed will be actuated by the common gate signal to actually establish a conductive path between the respective output lead and the ground bus. It can thus be seen that the internal latching circuit or memory element associated with each test unit facilitates this operation also. If no improper connections affecting the network under test are present, the application of the gate signal will not produce the rise in supply current drain which is taken as indicative of an output circuit connection between the supply buses. In other words, the network under test may be accepted as being isolated from the other terminal points in the matrix.

As was described previously, the direct access provided to the gate terminals of the transistors 29 permits the use of a ramp voltage to perform this test. This is advantageous because, during this test of isolation, a large number of the transistors 29 are turned on at once. While an individual field-effect transistor is inherently current limiting as noted hereinbefore, a conductive path extending through the paralleled channels of a plurality of such transistors could so load the current supply that a precipitous drop in supply bus voltage might occur which could destroy the data latched into the various flip-flops 39. By using a ramp voltage to gate on the transistors 29, an increased current drain indicative of an output circuit connection can be sensed at a relatively low current level and then the application of the common gate signal can be terminated to prevent such an overload.

Since the testing apparatus of the present invention permits the controlling computer to perform continuity tests between any selected pair of terminals within the entire matrix as well as to test for isolation of any terminal, or group of terminals, from the rest of the terminal points in the entire matrix, it can be seen that, through the use of adaptive programming, a search out program can be initiated upon the discovery of a fault and, through testing and exhaustion of the various possibilities, the particular improper cross-coupling can be isolated. The length of the program required to perform such a test is considerably shortened by the ability of the apparatus to permit testing for isolation of the network under test from selected groups of terminal points so that the fault can be located in a general way, prior to point-by-point testing for the location of the fault.

Given the ability of the present apparatus to test, in a greatly facilitated manner, for the existence and location of an unknown connection as well as its ability to determine the existence of a connection between any selected pair of points within the matrix and to likewise determine the isolation of any group of points constituting a network from the rest of the matrix, it can further be understood by those skilled in the programming arts that an adaptive or learning program can be written which will, without prior knowledge of any of the connections in a matrix, exhaustively test the matrix to determine all the connections that exist. The results of this determination can be employed as a wiring list empirically derived. While such an exploratory analysis program will of course take substantially more time than a test program which proceeds on the basis of merely assuring that desired, predefined connections exist, the facilitated testing operation provided by the apparatus of the present invention permits such an empirical learning procedure to be accomplished in a relatively short period, i.e. a matter of minutes as compared with the time which might be required to even enter the information defining the interconnection of a matrix into a computer memory. Thus, given one properly wired matrix of terminal points, the testing apparatus of the present invention operating under computer control can analyze that matrix and store the date defining the various networks linking the terminal points in the matrix. Subsequently, other matrices can be tested from that stored information in relatively short periods of time to determine whether their wiring conforms to that of the original. Such a procedure may be highly desirable in the case of relatively small production runs where the cost of manually entering or defining the test information cannot be written off over a long production run. Similar benefits obtain where the pattern of networks linking the matrix of terminal points may be frequently changed.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A system for testing interconnections in a matrix of terminal points, said system comprising a plurality of continuity test switching units, one for each point, and a decoding network permitting each unit to be selectively addressed by means of coded selection signals, each of said testing units including a latch element which is set when the unit is addressed and a semiconductor switching means, said switching means being operative, during addressing of the unit, to connect the respective terminal point to a first bus which is common to all of said units and being operative, after termination of addressing and while said latch element is set, to connect the respective terminal point to a second bus also common to all of said units, whereby continuity in an interconnection network can be determined by testing for continuity between said first and second buses while sequentially addressing the test switching units corresponding to the points in the network, each latch element being resettable by a common reset signal to place said switching means in an initial state in which said terminal point is isolated from both of said buses, said switching means being responsive, while in said initial state, to a gate signal, common to a plurality of said units, for connecting the respective terminal point to said first bus, whereby isolation of a network previously addressed can be determined by applying said common gate signal to connect all remaining points to said first bus while testing for isolation between said first and second buses.

2. A system as set forth in claim 1 wherein said switching means comprises complementary conductivity type, field-effect transistors.

3. A system as set forth in claim 1 wherein said decoding network and said latch element comprise C–MOS field-effect transistor logic elements, said switching means comprises complementary conductivity type, MOS field-effect transistors, and said first and second buses are the supply buses for said logic elements and said transistors.

4. A system as set forth in claim 3 wherein said latch element comprises a flip-flop including a pair of interconnected NOR gates.

5. A system for testing interconnections in a matrix of terminal points, said system comprising a plurality of test switching units, one for each point, and a decoding network permitting each unit to be selectively addressed by means of coded selection signals, each of said testing units being operative, when addressed, to connect the respective point to a first bus, which first bus is common to all of said testing units, each of said testing units being also operative, after termination of addressing thereof, to latch the respective terminal point into connection with a second bus, also common to all of said testing means, whereby continuity in an interconnection network can be determined by testing for continuity between said first and second buses while sequentially addressing the test switching units corresponding to the points in the network, each unit being resettable, by a reset signal applied commonly to all said units, to an initial state in which the respective terminal is isolated from both buses, each unit, while in its reset condition, being responsive to a gate signal commonly applied to a plurality of said test switching units for connecting the respective terminal point to said first bus, whereby isolation of a network previously addressed can be determined by applying said common gage signal to connect all remaining points to said first bus while testing for isolation between said first and second buses.

6. A system for testing interconnections in a matrix of terminal points, said system comprising a plurality of continuity test switching units, one for each point, and a decoding network permitting each unit to be selectively addressed by means of coded selection signals, each of said testing units being operative, when addressed, to connect the respective point to a first bus, which first bus is common to all of said testing units, each of said testing units being also operative, after termination of addressing thereof, to connect the respective terminal point to a second bus, also common to all of said testing means, whereby continuity in an interconnection network can be determined by testing for continuity between said first and second buses while sequentially addressing the test switching units corresponding to the points in the network, said system including also a plurality of isolation test switching means, one for each terminal point, said isolation test switching means being responsive to a gate signal commonly applied to all of said isolation test switching means for connecting any terminal points not then connected to said second bus to said first bus in response to said gate signal, whereby isolation of a network previously addressed can be determined by applying said common gate signal to connect all remaining points to said first bus while testing for isolation between said first and second buses.

7. A system as set forth in claim 6 wherein each continuity switching unit includes a MOS field-effect transistor of one conductivity type connecting the respective point to said first bus and a MOS field-effect transistor of the opposite conductivity type connecting the respective point to said second type and wherein said isolation test switching means comprises a pair of MOS field-effect transistors of said one conductivity type connected in series to form a conduction path between the respective point and said first bus in parallel with the first said field-effect transistor.

8. A wiring test system for testing a matrix of connection points interconnected in an arbitrary plurality of networks, said system comprising a multiplicity of switching units all energized from a common pair of supply buses, one unit for each of said points, each unit comprising:

a first FET of one conductivity type connecting the respective point to a first of said supply buses;

second and third FETs of said first conductivity type, said second and third FETs being connected in series with other, with the series pair thereby formed being in parallel with said first FET;

a FET of conductivity type complementary to said first type connecting the respective point to the other supply bus;

a COS/MOS flip-flop having a set state and a reset state;

means for applying to said first FET a respective select signal provided to the unit to rendering said first FET conductive, said select signal being applied also to said flip-flop for placing it in its set state;

COS/MOS gate means responsive to said select signal and interconnecting said flip-flop and said complementary type FET for permitting said complementary type FET to be rendered conductive by said flip-flop in the set state after termination of said select signal, said third FET being interconnected so that said third FET is rendered non-conductive when said flip-flop is in its set state and conductive when said flip-flop is in its reset state;

means for applying a gate signal, common to all of said units, directly to the gate terminal of said second FET, whereby conduction between said point and said first bus can be developed progressively by a gradually changing gate signal when said flip-flop is in its reset state; and means for applying a reset signal, common to all of said units, to said flip-flop for placing it in its reset state, said test system comprising also COS/MOS decoding means permitting individual ones of said switching units to be selected by coded address signals applied commonly to said units, whereby continuity in a desired network can be tested by sequentially addressing the switching units corresponding to the point properly in the network while testing for continuity between said supply buses and isolation of said network can be tested by applying a progressively changing gate signal commonly to the second said FET in each unit while testing for essential isolation between said supply buses.

9. The method of testing for a desired interconnection of a matrix of terminal points establishing a plurality of networks, said method comprising for each network in sequence the steps of:

sequentially connecting each point in the network under test first to a first, single conductor bus and then to a second, single conductor bus, previous points in each network being maintained in connection with said second bus during connection of subsequent points in the same network to said first bus;

during connection of each point in turn to said first bus, testing for continuity between said first bus and said second bus;

after all points in the selected network under test are connected to said second bus, connecting all other points in said matrix simultaneously to said first bus; and during connection of said other points to said first bus, testing for isolation between said first bus and said second bus.

10. The method of testing for a desired interconnection of a matrix of terminal points establishing a plurality of networks, said method comprising for each network in sequence the steps of:

in sequence for each point in the network, connecting that point first to a first, single conductor bus and then latching that point into connection with a second, single conductor bus;

during connection of each point in turn to said first bus, testing for continuity between said first bus and said second bus; after all points in the network under test are connected to said second bus, connecting all other points in said matrix simultaneously to said first bus;

during connection of said other points to said first bus, testing for isolation between said first bus and said second bus; and then delatching all points from either bus before proceeding to the next network.

11. The method of operating a test system comprising a plurality of test switching units, one for each terminal point in a wiring matrix to be tested, each testing unit being operative, when addressed, to connect the respective point to a first bus, which first bus is common to all of said testing units, and operative, after termination of addressing, to connect the respective terminal point to a second bus, also common to all of said switching units, each unit including also an isolation test means responsive to a common gate signal for connecting the respective terminal point to said first bus in response to said gate signal, said method comprising:

addressing sequentially the units corresponding to the points in a preselected network to be tested and simultaneously disabling the respective isolation test means in each addressed unit;

testing for continuity between said first bus and said second bus as each unit is addressed;

applying a gate signal commonly to all said test units; and during the application of said gate signal, testing for isolation between said first bus and said second bus.

* * * * *